United States Patent
Brandl et al.

(10) Patent No.: US 9,216,375 B2
(45) Date of Patent: Dec. 22, 2015

(54) METHOD FOR SELECTIVELY DESULFURIZING A CRUDE SYNTHESIS GAS

(71) Applicant: LINDE AKTIENGESELLSCHAFT, Munich (DE)

(72) Inventors: Alexander Brandl, Munich (DE); Anna Maria Fischer, Munich (DE)

(73) Assignee: LINDE AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 14/419,944

(22) PCT Filed: Aug. 6, 2013

(86) PCT No.: PCT/EP2013/002349
§ 371 (c)(1),
(2) Date: Feb. 6, 2015

(87) PCT Pub. No.: WO2014/023419
PCT Pub. Date: Feb. 13, 2014

(65) Prior Publication Data
US 2015/0165366 A1 Jun. 18, 2015

(30) Foreign Application Priority Data

Aug. 9, 2012 (DE) .......................... 10 2012 015 727
Aug. 21, 2012 (DE) .......................... 10 2012 016 643

(51) Int. Cl.
| | |
|---|---|
| B01D 53/14 | (2006.01) |
| C10K 1/00 | (2006.01) |
| C10K 1/16 | (2006.01) |
| C10K 3/04 | (2006.01) |

(52) U.S. Cl.
CPC ............ B01D 53/14 (2013.01); B01D 53/1468 (2013.01); C10K 1/004 (2013.01);
(Continued)

(58) Field of Classification Search
CPC .................. B01D 53/1468; B01D 2252/2021; B01D 2252/2026; B01D 2252/20468; B01D 2252/20478; B01D 2256/16; B01D 2256/20; B01D 2256/22; B01D 2257/304; B01D 2257/308; C10K 1/004; C10K 1/16; C10K 3/04

See application file for complete search history.

(56) References Cited

U.S. PATENT DOCUMENTS

| | | | |
|---|---|---|---|
| 4,552,572 A | * | 11/1985 | Galstaun .......................... 95/161 |
| 4,568,364 A | | 2/1986 | Galstaun et al. |
| 4,824,452 A | | 4/1989 | Grunewald et al. |

FOREIGN PATENT DOCUMENTS

| | | |
|---|---|---|
| DE | 102008057937 A1 | 5/2010 |
| EP | 0279494 A2 | 8/1988 |
| FR | 2555601 A1 | 5/1985 |

OTHER PUBLICATIONS

International Search Report dated Nov. 19, 2013 issued in corresponding PCT/EP2013/002349 application (pp. 1-3).
(Continued)

*Primary Examiner* — Duane Smith
*Assistant Examiner* — Cabrena Holecek
(74) *Attorney, Agent, or Firm* — Millen, White, Zelano, Branigan, P.C.

(57) ABSTRACT

The invention relates to a method for operating a gas scrubber, in which a feed gas (1) containing hydrogen, carbon monoxide, carbon dioxide and carbonyl sulfide and/or hydrogen sulfide is scrubbed in a scrubbing apparatus (A1) using a scrubbing agent (3, 4) preladen with carbon dioxide in order largely selectively to separate the sulfur components from the feed gas and to produce a desulfurized gas stream (5, 9). The invention is distinguished in that a sulfur-free scrubbing agent (3, 4) is used which, on introduction thereof into the scrubbing apparatus (A1), has a carbon dioxide partial pressure which is greater than or equal to the carbon dioxide partial pressure in the feed gas (1) to be desulfurized.

7 Claims, 1 Drawing Sheet

(52) U.S. Cl.
CPC .. *C10K 1/16* (2013.01); *C10K 3/04* (2013.01); *B01D 2252/2021* (2013.01); *B01D 2252/2026* (2013.01); *B01D 2252/20468* (2013.01); *B01D 2252/20478* (2013.01); *B01D 2256/16* (2013.01); *B01D 2256/20* (2013.01); *B01D 2256/22* (2013.01); *B01D 2257/304* (2013.01); *B01D 2257/308* (2013.01)

(56) References Cited

OTHER PUBLICATIONS

English Translation Abstract of FR 2555601 A1 published May 31, 1985.
English Translation Abstract of DE 102008057937.

\* cited by examiner

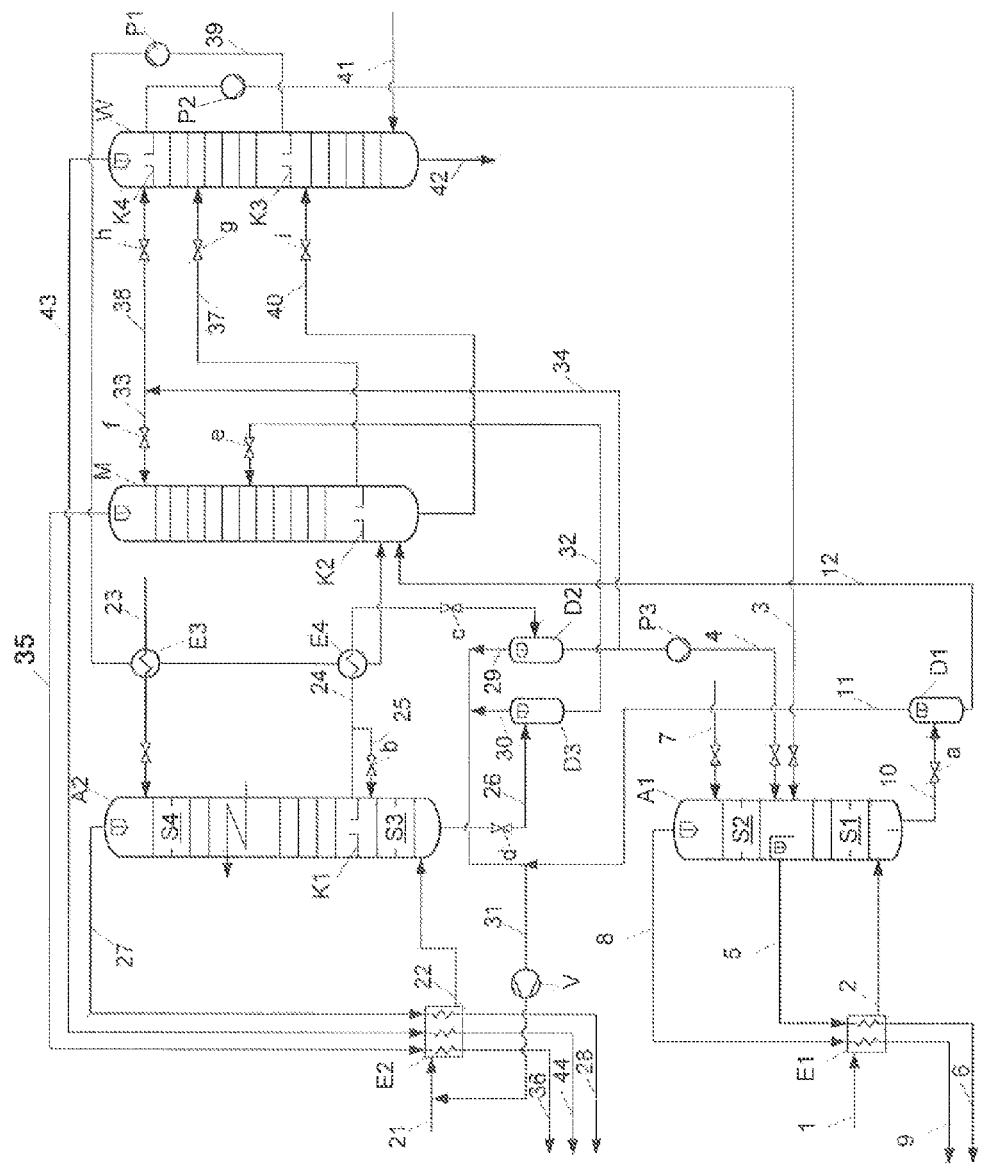

METHOD FOR SELECTIVELY DESULFURIZING A CRUDE SYNTHESIS GAS

The invention relates to a method for operating a gas scrubber, in which a feed gas containing hydrogen, carbon monoxide, carbon dioxide and carbonyl sulfide and/or hydrogen sulfide is scrubbed in a scrubbing apparatus using a scrubbing agent preladen with carbon dioxide in order largely selectively to separate the sulfur components from the feed gas and to produce a desulfurized gas stream.

For the purposes of the present description, a desulfurized gas stream should be taken to mean a gas stream, the sulfur component content of which is below a predetermined limit value. Complete absence of sulfur, which in any event cannot be achieved at reasonable cost, is not necessary.

Gas scrubbers are used to scrub specific components from gas mixtures. They exploit the characteristic of liquids of absorbing gaseous substances and keeping them chemically or physically bound in solution. The effectiveness with which a gas is absorbed by a liquid is expressed by the solubility coefficient: the better the gas dissolves in the liquid, the greater is its solubility coefficient. The solubility coefficient generally increases with falling temperature and, according to Henry's law of absorption, with rising pressure.

After the gas scrubber, the gas components removed by scrubbing are removed from the laden scrubbing agent, whereby the scrubbing agent is regenerated. While the scrubbed gas components are either discarded or put to economically viable use, the regenerated scrubbing agent is normally reused in the gas scrubber.

According to the prior art, hydrogen and carbon monoxide are obtained on a large industrial scale by converting feed materials containing carbon into a crude synthesis gas by gasification. In addition to the wanted constituents hydrogen and carbon monoxide, such a crude synthesis gas also contains a series of unwanted constituents such as carbon dioxide ($CO_2$), hydrogen sulfide ($H_2S$) and carbonyl sulfide (COS). The crude synthesis gas is preferably subjected to physical gas scrubbing in order to separate the unwanted from the wanted constituents. Such a method is appropriate for this purpose since the crude synthesis gases today are generally produced at elevated pressure, and the efficiency of a physical gas scrubber increases in a first approximation linearly with the operating pressure. Methanol scrubbing, in which liquid methanol is used as the scrubbing agent at temperatures far below 0° C., is of particular significance for the purification of crude synthesis gases. "Gas Separation & Purification", December 1988, vol. 2, p. 171-176 describes a methanol scrubber in which carbon dioxide and sulfur components are selectively removed in two successive scrubbing steps from a crude synthesis gas containing hydrogen, carbon monoxide and carbon dioxide together with $H_2S$ and COS. To this end, the crude synthesis gas is passed into an absorber column, in which a first and a second scrubbing section are arranged one above the other. The carbon dioxide is separated by using unladen methanol in the second scrubbing section, while the sulfur components are removed in the first scrubbing section by scrubbing with a proportion of the methanol which has already been preladen with carbon dioxide during separation of the carbon dioxide. Since the sulfur components have a solubility coefficient with regard to methanol which is a multiple higher than that of carbon dioxide, only a fraction of the quantity of scrubbing agent laden in the second scrubbing section with carbon dioxide is required to separate them.

If the gas mixture containing hydrogen and carbon monoxide produced by scrubbing from the crude synthesis gas is to be supplied to a gas turbine as combustion fuel, it is desirable to remove the sulfur components as completely as possible as, on the one hand, they would lead to damage to the gas turbine and, on the other hand, there are applicable waste gas emission standards which must be complied with. At the same time, it is desirable largely completely to retain the carbon dioxide in the gas mixture, as it is required as a temperature moderator and working medium in the gas turbine. It is prior art to scrub the crude synthesis gas in a scrubbing step which uses the minimum quantity of unladen scrubbing agent which is required to separate the sulfur components. A largely sulfur-free gas mixture, but with a distinctly reduced carbon dioxide content arises here, because the scrubbing agent absorbs not only the sulfur components but, to a considerable extent, carbon dioxide as well. The sulfur-free gas mixture is therefore possibly only to a certain extent suitable for use in a gas turbine.

The object of the present invention is accordingly to configure a method of the above-described kind in such a manner that the smallest possible proportion of the quantity of carbon dioxide present in the feed gas is removed by scrubbing during desulfurization.

Said object is achieved according to the invention in that a sulfur-free scrubbing agent is used which, on introduction thereof into the scrubbing apparatus, has a carbon dioxide partial pressure which is greater than or equal to the carbon dioxide partial pressure in the feed gas to be desulfurized.

The method according to the invention ensures that carbon dioxide cannot be absorbed or can be absorbed only in very small quantities from the feed gas to be desulfurized by the scrubbing agent. If the preladen scrubbing agent has a higher carbon dioxide partial pressure than the feed gas to be desulfurized, carbon dioxide may even be released from the scrubbing agent, such that a stream of carbon dioxide which is larger than that introduced into the scrubbing apparatus with the feed gas may be drawn off from the scrubbing apparatus with the desulfurized gas mixture.

The sulfur-free scrubbing agent preladen with carbon dioxide is preferably supplied from a second gas scrubber which is operated in parallel, in which carbon dioxide is selectively removed by scrubbing with the assistance of a sulfur-free scrubbing agent from a gas mixture which has a carbon dioxide pressure which is higher than the carbon dioxide partial pressure of the feed gas to be desulfurized. The scrubbing agent laden in the scrubbing apparatus of the second gas scrubber therefore has a carbon dioxide partial pressure which is sufficiently high for the scrubbing agent to be usable for the desulfurization according to the invention. At the same time, the scrubbing agent laden in the scrubbing apparatus of the second gas scrubber has a partial pressure of sulfur components which is sufficiently low for the scrubbing agent to be usable for the desulfurization according to the invention with the desired sulfur purity.

The carbon dioxide partial pressure generally rises continuously from when the scrubbing agent enters the scrubbing apparatus until it leaves the scrubbing apparatus, such that the scrubbing agent has the highest carbon dioxide partial pressure immediately downstream of the scrubbing apparatus. It may nevertheless make sense to draw off laden scrubbing agent from another point in the second gas scrubber and to make use of it for the sulfur separation according to the invention. Laden scrubbing agent with a lower carbon dioxide partial pressure arises in the regeneration part of the gas scrubber. In particular in physical gas scrubbers, the scrubbing agent may, however, here have a distinctly lower temperature than immediately downstream of the scrubbing apparatus. By using the colder scrubbing agent it is possible to leave all or a large proportion of the heat of solution arising during desulfurization in the scrubbing agent without there being any risk of not complying with the required sulfur limit values. The method according to the invention thus makes it possible entirely or in part to dispense with costly external cooling, as is required according to the prior art, in order to dissipate the heat of solution from the scrubbing apparatus. The invention provides drawing off scrubbing agent preladen with carbon dioxide immediately downstream of the scrubbing apparatus and/or from the cold regeneration part of the second gas scrubber and using it for desulfurizing the feed gas.

The method according to the invention may particularly preferentially be used if it is desired to obtain at least one hydrogen product together with a fuel gas for a gas turbine from a crude synthesis gas containing hydrogen, carbon monoxide, carbon dioxide and sulfur components, and the crude synthesis gas is divided to this end into a first and a second sub-stream, wherein the first sub-stream, possibly after a drying step, is supplied directly as a feed gas to a gas scrubber, while the carbon monoxide present in the second sub-stream is converted by water-gas shift (conversion) with water to yield hydrogen and carbon dioxide, before the resultant gas mixture is passed as feed gas into a second gas scrubber. While the intention is to obtain the fuel gas for the gas turbine in the first gas scrubber by desulfurization from the unshifted feed gas, carbon dioxide and sulfur components are selectively separated from the shifted feed gas in the second gas scrubber, whereby a crude hydrogen product is obtained. Due to the carbon dioxide produced by the water-gas shift, the shifted feed gas for the second gas scrubber has a higher carbon dioxide partial pressure than the unshifted feed gas for the first gas scrubber. The same scrubbing agent is expediently used in both gas scrubbers, such that sulfur-free scrubbing agent laden with carbon dioxide arising in the second gas scrubber may be used in the first gas scrubber in order to separate sulfur components from the unshifted feed gas.

If, in addition to a merely desulfurized gas stream containing carbon dioxide, a further gas stream is to be produced from the feed gas containing hydrogen, carbon monoxide, carbon dioxide and sulfur components, which further gas stream is both desulfurized and also free of carbon dioxide, one refinement of the method according to the invention provides for a sub-stream of the merely desulfurized gas stream to be subjected to further scrubbing with unladen scrubbing agent.

The method according to the invention is suitable for use in gas scrubbers which make use of physically and/or chemically acting scrubbing agents. Examples of such scrubbing agents which may be mentioned are methanol, ethanol, dimethyl polyethylene glycol ether (DMPEGE), N-methylpyrrolidone (NMP), amines and the derivatives thereof (for example methyldiethanolamine (MDEA), monoethanolamine (MEA) and diethanolamine (DEA)) and mixtures of these scrubbing agents. It is, however, particularly advantageously used in methanol scrubbers in which components are separated from gas mixtures with the assistance of cryogenic methanol.

The invention will be explained in greater detail below with reference to an exemplary embodiment illustrated schematically in FIG. 1.

BRIEF DESCRIPTION OF THE DRAWING

FIG. 1 shows a methanol scrubber in which a shifted and an unshifted crude synthesis gas are processed in two scrubbing apparatuses operated in parallel.

In order to obtain a fuel for a gas turbine, the unshifted crude synthesis gas 1, which also contains carbon dioxide and sulfur components, in addition to hydrogen and carbon monoxide, is introduced into the heat exchanger E1 and cooled there against process streams to be preheated, before it can be fed via line 2 into the lower zone of the scrubbing apparatus A1, which takes the form of an absorber column. In the absorber column A1, which is typically operated at pressures of between 20 and 80 bar and which comprises a first scrubbing section S1 and a second scrubbing section S2, the cooled crude synthesis gas flows upwards and as a result is brought into intimate contact with methanol scrubbing agent, which is fed via lines 3 and 4 into the upper end of the scrubbing section S1. The two sulfur-free methanol streams 3 and 4 are preladen with carbon dioxide and enter the scrubbing section S1 with a carbon dioxide partial pressure which is greater than the carbon dioxide partial pressure in the crude synthesis gas 2 to be scrubbed, from which the sulfur components, but no or only very little carbon dioxide, are therefore removed. A desulfurized gas mixture 5, which contains hydrogen and carbon monoxide and to a large part consists of carbon dioxide, may thus be drawn off via a side outlet. After preheating of the crude synthesis gas 1 to be cooled, the gas mixture 5 is finally supplied to a gas turbine (not shown) as combustion fuel 6. A proportion of the gas mixture desulfurized in the scrubbing section S1 is conveyed onward into the scrubbing section S2, where the carbon dioxide is also removed by scrubbing with the aid of unladen methanol 7 supplied at the top of the scrubbing column A1, such that a gas mixture 8 consisting of hydrogen and carbon monoxide may be guided out of the column A1 and, after preheating against the crude synthesis gas 1 to be cooled, be supplied as purified synthesis gas 9 for further use. In order to separate hydrogen and carbon monoxide co-absorbed during scrubbing, the laden scrubbing agent 10 is drawn off from the bottom of the absorber column A1 and expanded via the constriction member a into the separator D1, wherein a gas phase 11 predominantly consisting of hydrogen and carbon monoxide, and methanol 12 laden with carbon dioxide and sulfur components are obtained.

The shifted crude synthesis gas, which has a higher carbon dioxide content than the unshifted synthesis gas 1, is introduced via line 21 into the heat exchanger E2 and cooled there against process streams to be preheated, before it may be fed via line 22 into the lower zone of the second scrubbing apparatus A2, which likewise takes the form of an absorber column. The absorber column A2, which is typically operated at a pressure between 15 and 75 bar, comprises a lower scrubbing section S3 and an upper scrubbing section S4, which are separated from one another by a chimney tray K1. The cold crude synthesis gas is guided upwards in the absorber column A2 and as a result brought into intimate contact with methanol scrubbing agent, which is introduced unladen into the scrubbing section S4 via line 23. Via the lines 24 and 25 and the control member b, methanol scrubbing agent already preladen with carbon dioxide is conveyed onward into the scrubbing section S3, where it primarily absorbs sulfur components from the crude synthesis gas, before, laden with carbon dioxide and sulfur components, it is drawn off from the bottom chamber of the absorber column A2 and guided onward via line 26. A gas 27 largely consisting of hydrogen and carbon monoxide may be drawn off from the top of absorber column A2, which gas, after preheating against the crude synthesis gas 21, is discharged as a synthesis gas product 28.

The laden methanol streams 24 and 26 are expanded via the constriction members c and d into separators D2 and D3 respectively. The resultant gas phases, which predominantly consist of hydrogen and carbon monoxide co-absorbed in the gas scrubber, are recirculated, together with the gas phase 11 predominantly consisting of hydrogen and carbon monoxide, into the shifted crude synthesis gas 21 via lines 29 or 30 and 31 and the compressor V. In order to convert dissolved carbon dioxide into the gas phase, the laden methanol 32 is drawn off from the separator D3 and expanded via the constriction member e into the central portion of the medium-pressure column M which is typically operated at between 3 and 4.5 bar. Sulfur components which are likewise released on expansion are rescrubbed with a proportion 33 of the sulfur-free methanol stream 34 predominantly laden with carbon dioxide, which is expanded for this purpose via the constriction member f into the top of the medium-pressure column M. A largely sulfur-free carbon dioxide stream 35 may thus be drawn off from the medium-pressure column M, which carbon dioxide stream, after preheating against the crude synthesis gas 21, is discharged as a carbon dioxide product 36. A carbon dioxide-containing methanol which is predominantly laden with sulfur components collects in the chimney tray K2 of the medium-pressure column M, which methanol is drawn off via line 37 and expanded via the constriction member g into the central portion of the scrubbing column W. The second proportion 38 of the sulfur-free methanol stream 34 predominantly laden with carbon dioxide is introduced via the constriction member h into the top of the scrubbing column W for rescrubbing sulfur components. On expansion, a proportion of the carbon dioxide leaves the laden methanol, which is consequently simultaneously distinctly cooled. A methanol which is rich in sulfur components but still contains carbon dioxide is drawn off from the chimney tray K3 of the scrubbing column W with the assistance of the pump P1 via line 39 and, once it has been preheated in the heat exchangers E3 and E4 against regenerated 23 or laden methanol 24, is introduced together with the sulfur-laden methanol 12 into the bottom chamber of the medium-pressure column M. Due to the preheating, a proportion of the contained carbon dioxide is stripped from the methanol, which is discharged with the stream 35 from the top of the medium-pressure column M. The scrubbing agent furthermore laden with sulfur and residues of carbon dioxide is drawn off via line 40 from the bottom chamber of the medium-pressure column M and expanded via the constriction member i into the lower part of the scrubbing column W, where a further proportion of the dissolved carbon dioxide is stripped with the assistance of stripping gas 41. While the sulfur-rich methanol from the bottom chamber of the scrubbing column W is passed via line 42 to a hot regeneration stage (not shown), a proportion of the sulfur-free methanol stream 38 predominantly laden with carbon dioxide, after expansion via the constriction member h, is drawn off from the chimney tray K4 and, after pressurization, guided via the pump P2 as methanol scrubbing agent 3 to the top of the scrubbing section S1. The second methanol scrubbing agent 4 delivered with the assistance of the pump P3 to the top of the scrubbing section S1 is sulfur-free methanol from separator D2 which, while having a higher temperature, also has a higher carbon dioxide concentration than the methanol scrubbing agent 3. A carbon dioxide stream 43 is drawn off from the top of the scrubbing column W, which carbon dioxide stream, depending on the use of an optional stripping gas stream 41, may also contain nitrogen, and, after preheating against the crude synthesis gas 21, is discharged as tail gas 44.

The invention claimed is:

1. A method for operating a gas scrubber, said method comprising:

scrubbing a feed gas (1) containing hydrogen, carbon monoxide, carbon dioxide and carbonyl sulfide, hydrogen sulfide, or combinations thereof in a scrubbing apparatus (A1) using a scrubbing agent (3, 4) preladen with carbon dioxide to separate sulfur components from said feed gas and to produce a desulfurized gas stream (5, 9), wherein said scrubbing agent (3, 4) preladen with carbon dioxide is a sulfur-free scrubbing agent preladen with carbon dioxide which, on introduction thereof into the scrubbing apparatus (A1), has a carbon dioxide partial pressure which is greater than or equal to the carbon dioxide partial pressure in said feed gas (1) to be desulfurized, wherein said sulfur-free scrubbing agent (3, 4) preladen with carbon dioxide is supplied from a gas scrubber operated in parallel with said scrubbing apparatus (A1), in which carbon dioxide is selectively removed by scrubbing with the assistance of a sulfur-free scrubbing agent (23) from a gas mixture (21) which has a carbon dioxide partial pressure which is higher than the carbon dioxide partial pressure of the feed gas (1) to be desulfurized, and wherein sulfur-free scrubbing agent preladen with carbon dioxide is removed from said gas scrubber, expanded and sent to a gas/liquid separator, and liquid removed from said gas/liquid separator is used as said sulfur-free scrubbing agent (3, 4) preladen with carbon dioxide in said scrubbing apparatus (A1).

2. The method according to claim 1, wherein said feed gas (1) and said gas mixture (21) are both obtained from two sub-streams of a crude synthesis gas wherein only one of these two sub-streams is subjected to a water-gas shift thereby producing an unshifted first sub-stream (1) and a shifted second sub-stream gas (2).

3. The method according to claim 1, wherein said scrubbing apparatus (A1) is a methanol scrubber.

4. The method according to claim 1, said scrubbing apparatus (A1) operates at a pressure between 20 and 80 bar and said gas scrubber operates at a pressure between 15 and 75 bar.

5. The method according to claim 1, said gas scrubber comprises a lower scrubbing section (S3) and an upper scrubbing section (S4), which are separated from one another by a chimney tray (K1), wherein said gas mixture (21) is introduced into said lower scrubbing section (S3) and flows into said upper scrubbing section (S4), said sulfur-free scrubbing agent (23) is introduced into said upper scrubbing section (S4), said sulfur-free scrubbing agent preladen with carbon dioxide is removed from said upper scrubbing section (S4) of said gas scrubber, a portion of said sulfur-free scrubbing agent preladen with carbon dioxide is removed from said upper scrubbing section (S4) is sent to said lower scrubbing section (S3), and another portion of said sulfur-free scrubbing agent preladen with carbon dioxide is sent to said gas/liquid separator after being expanded.

6. The method according to claim 1, said scrubbing apparatus (A1) comprises a lower scrubbing section (S1) and an upper scrubbing section (S2), wherein said feed gas (1) and said scrubbing agent (3, 4) preladen with carbon dioxide are both introduced into said lower scrubbing section (S1) and a desulfurized gas mixture is formed in said lower scrubbing section (S1), and wherein a portion of said desulfurized gas mixture (5) is removed from said lower scrubbing section (S1).

7. The method according to claim 6, wherein a further portion of said desulfurized gas mixture is conveyed into said upper scrubbing section (S2) and unladen scrubbing agent is introduced into said upper scrubbing section (S2), whereby carbon dioxide is removed from said further portion of said desulfurized gas mixture by scrubbing to produce a purified synthesis gas (9).

* * * * *